Figure 1:
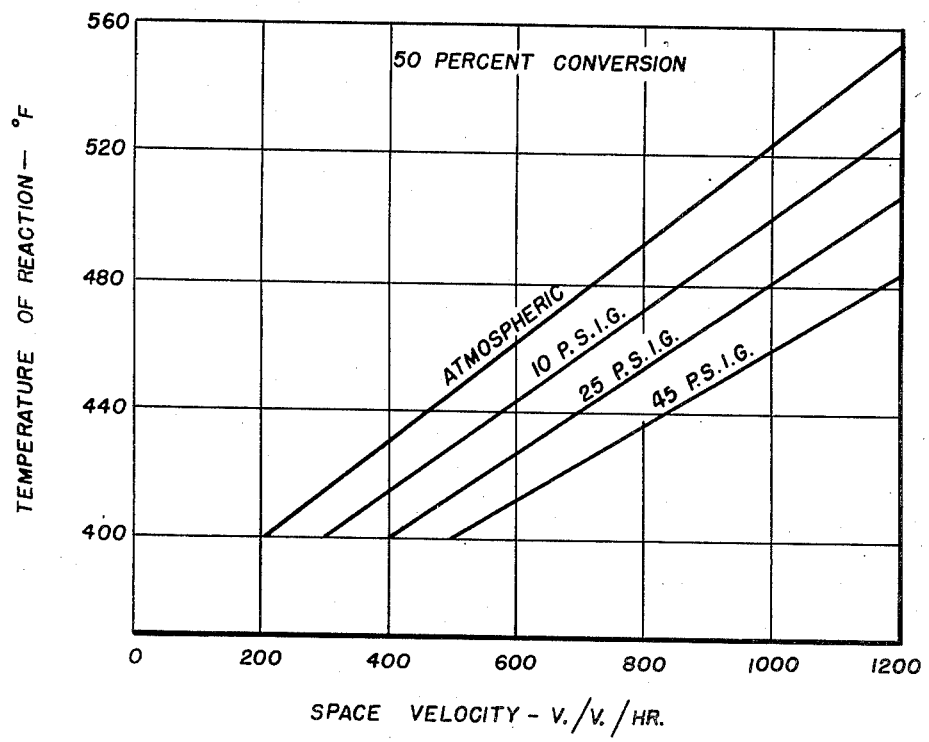

Oct. 21, 1952     L. C. RUBIN ET AL     2,615,035
SYNTHESIS OF ORGANIC COMPOUNDS

Filed Sept. 1, 1948

INVENTOR.
LOUIS C. RUBIN
EARL W. RIBLETT
BY HENRY G. McGRATH
ATTORNEYS

UNITED STATES PATENT OFFICE 2,615,035

SYNTHESIS OF ORGANIC COMPOUNDS

Louis C. Rubin, West Caldwell, Earl W. Riblett, Tenafly, and Henry G. McGrath, Elizabeth, N. J., assignors to The M. W. Kellogg Company, Jersey City, N. J., a corporation of Delaware Application September 1, 1948, Serial No. 47,184

6 Claims. (Cl. 260—449.6)

This invention relates to an improved method for reacting hydrogen and carbon monoxide to produce normally liquid hydrocarbons. More particularly, this invention relates to an improved method for hydrogenating carbon monoxide to produce liquid hydrocarbons in the presence of a hydrogenating catalyst comprising a catalytic metal of group VIII of the periodic system having an atomic number higher than 26, such as nickel, cobalt and ruthenium. Still more particularly, the invention relates to an improved method for reacting hydrogen and carbon monoxide to effect substantial conversion of the carbon monoxide reactant to normally liquid hydrocarbon products at a high space velocity while restricting the conversion of the carbon monoxide reactant to hydrocarbons of lower molecular weight than propylene, such as methane and ethane. This application is a continuation-in-part of our prior application Serial No. 550,802, filed August 23, 1944, now abandoned.

The catalytic metals referred to above are customarily employed in combination with suitable inert supporting materials, and are employed advantageously also in combination with small amounts of promoters in the form of metal oxides, such as alkalis, alumina, silica, titania, thoria, magnesia and manganese oxide. For example, a catalyst extensively employed comprises metallic cobalt in combination with approximately twice its weight of an inert support, such as kieselguhr, clays, etc., and approximately $\frac{1}{10}$ its weight of magnesia or thoria. In forming such catalytic contact material the hydrogenating metal is precipitated, as the oxide, on the inert supporting material. Any promoting oxide which is employed is also precipitated on the inert support at the same time. The resulting mixture is then further treated to convert it to the desired size for use.

Catalysts of the character described above have been employed extensively in the conversion of carbon monoxide and hydrogen to normally liquid hydrocarbons in operations in which the catalyst, in the form of granules of substantial size, is contained, as a fixed bed, in elongated tubes or cases having small cross-sectional dimensions. Alternatively, the granular catalyst is placed outside of tubes through which cooling fluid circulates. The elongated tubes or cases are of small cross-sectional dimension in order to facilitate rapid transfer of the heat of reaction from the centers of the fixed masses of catalyst to the cooling fluid which surrounds such tubes or cases. Likewise in the alternative arrangement the tubes and connecting fins are placed so close together that no part of the catalyst mass is more than about ½ inch from a cooling surface.

In such previous operations the reaction zone temperature has been maintained within a relatively narrow temperature range in order to obtain a hydrocarbon product having a satisfactory distribution of components. It is desired ordinarily to effect substantial conversion of the carbon monoxide to normally liquid hydrocarbons while restricting the formation of low molecular weight hydrocarbons having less than 3 carbon atoms per molecule, such as methane and ethane. It is found that with the above catalysts the optimum reaction temperature falls between 370 and 380° F. at the space velocities ordinarily employed. In operations employing space velocities in which there is adequate conversion of the reactants to liquid products it is necessary to employ temperatures below 400° F. to effect adequate conversion to liquids without excessive formation of the light gases such as methane and ethane. Thus, in commercial operations employing the above described fixed catalyst bed, it is customary to raise the temperature from 350° F. to approximately 390° F. as the activity of the catalyst declines. At that point regeneration is carried out since higher temperatures cause excessive formation of gas. Excessive formation of hydrocarbons lighter than propylene may be said to occur when more than 20% of the carbon monoxide reactant is converted to such light hydrocarbons. Preferably that figure should be restricted to not more than 15% when effecting conversion of approximately 50% of the carbon monoxide reactant.

The object of this invention is to provide those operating conditions necessary in a fluidized synthesis process for the production of normally liquid products without excessive formation of waxes and other relatively heavy organic compounds.

Another object of this invention is to provide a continuous synthesis process using a suspended catalyst in finely-divided form in which the catalyst does not agglomerate, deaerate, or stick together as the result of excessive wax formation and deposition on the catalyst.

Still another object of this invention is to produce a high quality diesel fuel.

A further object of this invention is to provide a process for the hydrogenation of carbon monoxide using a suspended catalyst in finely-divided form in which the formation of relatively low boiling organic products is minimized.

Various other objects and advantages of this invention will become apparent from the accompanying disclosure and description.

It has been discovered that substantially higher temperatures may be employed without excessive gas formation if the catalytic contact mass is employed in a finely-divided condition and the reactants are passed therethrough under conditions effective to maintain the contact mass in a suspended condition. In this method the gas stream comprising the hydrogen and carbon monoxide reactants is passed upwardly in a reaction zone through a mass of catalyst in a powdered condition. In this method the gas stream is passed through the catalyst powder at a velocity which is effective to suspend the catalyst in the gas stream in a dense fluidized pseudo-liquid condition in which the particles of catalyst circulate in the mass at a high rate. If the velocity of the gas stream is maintained sufficiently low the catalyst mass assumes a condition which is described as "pseudo-liquid" for the reason that the mass exhibits many of the properties of a true liquid, particularly as to flowability and density. The gas velocity necessary to produce this condition depends somewhat upon the character and condition of the catalyst, but it is preferred ordinarily to pass the gas stream through the catalyst at a velocity which is sufficiently low to produce the above-described condition but sufficiently high to produce turbulence in the mass whereby the particles circulate at a high rate throughout the mass.

Under the conditions described above, the fluidized mass of contact material is quite dense, resembling in this respect a settled mass of the same material. The density of the fluidized mass may be not less than half that of the settled mass. The fluidized catalyst mass is suspended in the gas stream but there is no movement of the catalyst mass as a whole along the path of flow of the gas stream. Thus, while the catalyst mass is suspended in the gas stream, it is not entrained therein. However, a small proportion of the particles of the fluidized mass may become entrained and carried away, in the gas stream emerging from the dense pseudo-liquid catalyst mass.

To produce the fluidized catalyst mass the gas stream is passed into the bottom of the reactor through a relatively small inlet at an inlet velocity such that solids in the reactor are prevented from passing downwardly out of the reactor through the gas inlet. The horizontal dimension of the reactor and the rate of flow of the gas stream into the reactor are controlled to produce in the reactor a gas velocity effective to maintain the catalyst mass in the fluidized condition. This velocity is defined ordinarily in terms of the velocity of the gas stream through an empty reactor, which is referred to as the superficial velocity. Ordinarily, superficial velocities of 0.1 to 10 feet per second are employed.

It is preferred, ordinarily, to provide a reactor having a volume substantially greater than the desired volume of the fluidized catalyst mass. In such a large reactor the catalyst forms the relatively dense fluidized mass described above which occupies the lower part of the reactor and which is referred to hereafter as the dense phase. In the upper part of the reactor the density of catalyst in the gas is substantially less and of a different order of magnitude than the density of the catalyst in the dense phase. The upper phase may be referred to as a diffuse phase. In the diffuse phase there is substantial disengagement by settling of solids which are lifted above the dense phase by the gas stream. Depending upon the gas velocity and the particle size of the catalyst mass, such settling may effect substantially complete disengagement of solids from the gas stream. Ordinarily, however, a substantial proportion of the particles comprising the catalyst mass has a free settling rate less than the superficial velocity of the gas stream, whereby a small proportion of the catalyst is carried from the reactor in the exit gas stream, in the absence of special means to effect separation of the suspended solids from the gas stream.

Between the dense catalyst phase and the upper diffuse phase there is a visual interface which is a relatively narrow zone in which the concentration of solids in the gas stream changes from the high concentration of the dense phase to the low concentration of the diffuse phase.

In order to produce the desired turbulent pseudo-liquid condition in the dense phase, it is desirable that at least a substantial proportion of the contact material consist of particles whose free settling rate is less than the superficial velocity of the gas stream. The mass of contact material may consist of particles whose free settling rate is less than the superficial velocity of the gas stream. The mass of contact material may consist advantageously of a mixture of particles varying in size from 40 to 400 microns (average diameter), although particles of larger or smaller diameter may be present.

The operation is initiated by charging the reactor with the desired quantity of the contact material. Thereafter, the contact mass in the reactor is fluidized by the passage of a gas stream upwardly therethrough at the proper velocity. Alternatively, a gas stream may be passed through the empty reactor while catalyst is charged to the reactor at a rate in excess of the rate at which catalyst is carried out of the reactor in the gas stream. In this manner the desired volume of fluidized dense phase may be built up. During the operation it may be necessary to add catalyst to the reactor continuously or intermittently to replace catalyst carried from the reactor with the product gas stream, or to replace deactivated catalyst.

The reaction is initiated by heating the fluidized contact mass to a temperature effective to initiate the reaction. Thereafter, it is necessary to cool the fluidized contact mass to maintain the reaction temperature at the desired level. It is a feature of this method of operation that the circulation of the particles in the fluidized mass promotes rapid and efficient heat exchange between the various parts of the fluidized mass whereby a substantially uniform condition in the mass is maintained. Consequently, the excess heat of reaction may be withdrawn from the reaction zone by cooling a part of the fluidized mass. This may be effected in part by introducing the reaction gas in a substantially cold condition, but it is necessary ordinarily to provide additional means for withdrawing heat from the contact mass. This may be provided for by indirect heat exchange means of the character indicated below in an example.

In a modification of this invention, the linear gas velocity in the reactor may be maintained sufficiently high to entrain all of the finely-divided catalyst particles in the gas stream passing through the reaction zone. In this modification, the net movement of the catalyst particles is in the direction of flow of the gases, and at the relatively high gas velocity the catalyst may move at substantially the same velocity as the gases. For this modification, velocities between about 6 and about 40 feet per second are appropriate, usually above about 8 or 10 feet per second depending on various factors, such as density of the catalyst particles, particle size, operating conditions, etc. The effluent containing entrained catalyst passes to a conventional solids separator where entrained catalyst is separated from the effluent. At least a major proportion of the separated catalyst is returned directly to the inlet of the reactor. A minor proportion of the catalyst may be withdrawn from the system for regeneration or other purposes. Fresh or regenerated catalyst is added to the system to replace the withdrawn catalyst.

In preparing the catalyst in the finely-divided form for this purpose, the general methods of preparation formerly employed in the preparation of the pelleted, or granular catalyst may be followed, except that the mass is maintained in a finely-divided condition. This may require grinding of the catalyst materials before or after reduction, or both. For example, the desired hydrogenating metal, such as cobalt, is precipitated as the oxide on the finely-divided supporting material, such as bentonite clay, particularly an acid treated bentonite clay known as "Super-Filtrol." If a promoting oxide is desired, it may be incorporated in the mixture by precipitating it on the support along with the hydrogenating metal. The resulting mixture after suitable drying, and grinding if necessary, is subjected to a reducing temperature of approximately 700° F. to reduce the oxide of the hydrogenating metal.

In carrying out the improved method of operation in connection with the type of operations described above, the temperature level in the suspended mass of catalyst is maintained substantially higher than the maximum temperature at which the same reactants could be contacted with the catalyst in a granular form in a fixed bed operation under comparable operating conditions of space velocity and pressure. The temperatures employed ordinarily are at least 20° F. above the said maximum permissible temperature in a fixed bed operation and are ordinarily in the range of 50 to 100° F. above the said maximum fixed catalyst bed temperature. This permits passing the reactants through the reaction zone at a substantially higher rate per unit of catalyst present than that permissible in fixed catalyst bed operations at the lower temperature, in effecting substantial conversion of the reactants to the desired normally liquid hydrocarbons. For example, the improved process involves contacting the reactants and catalytic contact material at a temperature at least 20° F. above the maximum permissible in fixed catalyst bed operations under comparable catalyst age and operating conditions to convert at least 40% of the carbon monoxide reactant to a liquid hydrocarbon product while restricting to less than 20% of the conversion of carbon monoxide reactant to hydrocarbons of lower molecular weight than propylene.

In the foregoing discussion, reference will be had to operations involving fluidized catalysts and fixed bed catalysts under comparable conditions of space velocity. It will be understood that this requires the passage of the reactants through the reaction zones at the same flow rates per unit weight of contact mass. The volume of the dense phase of the fluidized catalyst mass may occupy the same volume as a like quantity of contact material in the form of pellets. This depends, however, upon the density which is maintained in the fluidized bed of catalyst and upon the particle size of the individual granules in the fixed catalyst bed. Ordinarily, the fluidized bed exhibits a higher density than the fixed bed.

The improved process may be carried out at any space velocity which is effective to maintain the proper fluidized conditions in the catalyst bed and produce the desired product distribution at a desired rate of conversion. It has been found that flow rates are desirable which are substantially higher than the flow rates of gas per unit weight of catalyst ordinarily employed. Space velocities of 50 or more, preferably 200 to 2,000 standard volumes of gas per hour per unit volume of dense catalyst phase are employed with advantage, the higher space velocities being generally used with higher pressures and temperatures. Any operating pressure from atmospheric to the maximum pressure available may be employed; usually, pressures higher than about 400 pounds per square inch gage are not employed because of excessive wax formation on the catalyst. Preferred pressures are from atmospheric to about 50 pounds per square inch gage. The preferred temperature range depends largely upon the activity range of the catalyst employed. However, for most hydrogenating metal catalysts of the character defined above, and particularly for cobalt and nickel, the operating temperatures employed in this improved process fall within the range of 400 to 550° F., preferably between 440 and 500° F.

The higher the temperature employed, the greater the space velocity used because of the increase in reaction rate, and the less wax and other relatively high boiling organic compounds formed. Increase in space velocities greatly increases the capacity of the reaction equipment. Decrease in wax formation reduces the tendency of the finely-divided suspended catalyst to agglomerate and deaerate, and decreases coke formations on the catalyst, which fact increases the active life of the catalyst.

In general, the space velocity, temperature of reaction, pressures, and per cent conversion of carbon monoxide are dependent upon each other. For example, for a 50 per cent conversion per pass and one atmospheric pressure operation, temperature is approximately a direct function of the space velocity. Thus, for a space velocity of 200 v./v./hr., a temperature of 400° F. is employed, for a space velocity of 300 v./v./hr. a temperature of about 420° F. is employed, for a space velocity of 600 v./v./hr. a temperature of 465° F. is employed, and for a space velocity of about 1200 v./v./hr. a temperature of about 500° F. is employed. Figure 1 of the drawings shows the relationship at a typical gas composition of an $H_2$: CO ratio of 2:1 between the operating variable of temperature and space velocity at constant conversion and constant pressures. Conversions better than 50 per cent per pass may be obtained with space velocities as high as 300 v./v./hr. or even higher if the temperature of reaction is maintained about 435° F. or higher and as high as permissible without excessive formation of gases. In order to increase conversion, the space velocity is lowered for a given temperature, or the temperature is increased for a given space velocity, or the pressure may be increased for a given temperature and space velocity. In general, for constant pressure and space velocity every 10° F. increase in temperature increases the conversion 10%.

By increasing the pressure over a limited range between about atmospheric and about 100 pounds per square inch gage, the temperature may be decreased for a constant space velocity and conversion, or the space velocity may be increased for a constant temperature and conversion. An increase in about one atmosphere pressure permits an increase in space velocity of about 100 v./v./hr. for constant temperature and conversion.

In practice, the reaction is initiated at a temperature below 400° F., but is raised as rapidly as possible to the desired operating temperature without excessive formation of gas. The operating temperature is gradually increased as the catalyst ages to that necessary to maintain the required conversion without a substantial decrease in space velocity. During the major proportion of the life of the catalyst, the temperature is preferably maintained above about 435 or 440° F., usually about 450° F., and the space velocity is preferably maintained above about 500 v./v./hr., which conditions are ideal for high throughput and good conversions of carbon monoxide.

Increases in the mol ratio of hydrogen to carbon monoxide permits slightly lower temperatures for constant conversion and space velocity. The preferred range of $H_2$:CO ratio is between about 0.5:1 and about 5:1, preferably between about 1:1 and about 3:1.

The invention will be described further by reference to a specific example which was carried out in the reactor shown in Figure 2 of the accompanying drawings, which is a view in elevation, partly in cross-section, of a relatively small reactor suitable for carrying out the invention.

Figure 2:
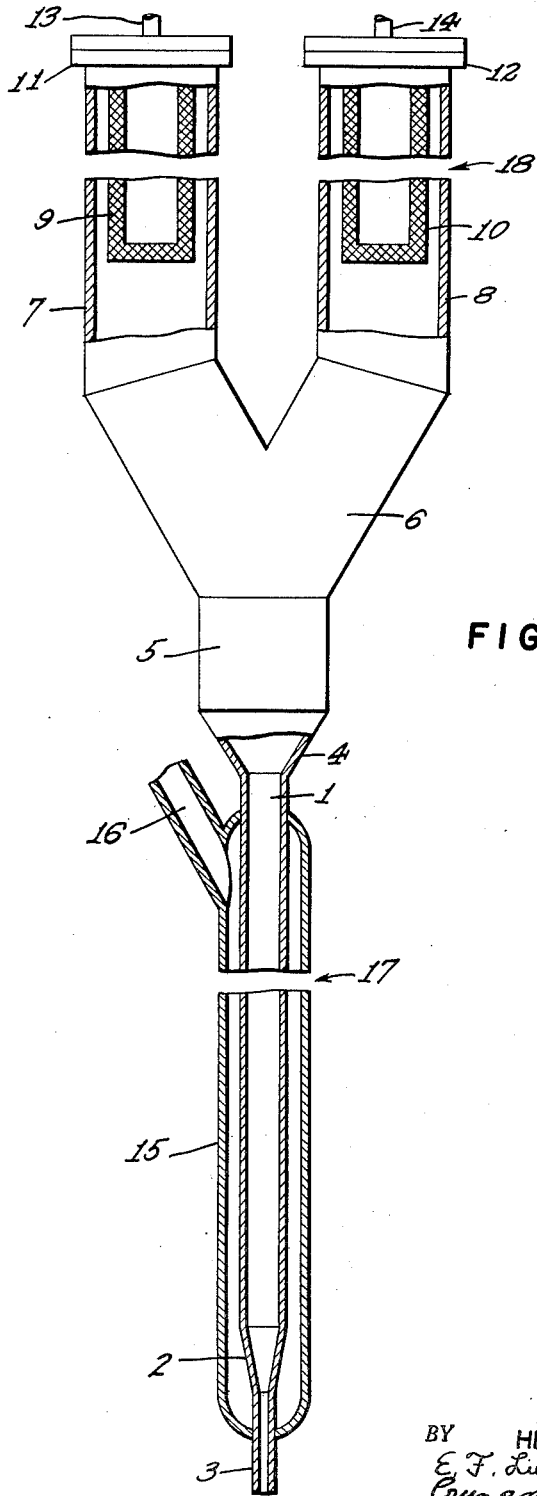

Referring to Figure 2 of the drawings, reactor 1 consists of a length of extra heavy 2-inch steel pipe which is 153 inches long and has inside and outside diameters of 1.94 inches and 2.38 inches, respectively. Reactor 1 is connected by a conical section 2 to an inlet pipe 3 made of extra heavy half-inch steel pipe having an inside diameter of 0.55 inch. Reactor 1 is connected at the top, by means of conical section 4, with an enlarged conduit 5 comprising a length of 6-inch extra heavy steel pipe having an inside diameter of 5.76 inches. Conical section 4 and conduit 5 constitute an enlarged extension of reactor 2 which facilitates disengagement of catalyst from the gas stream after passage of the latter through the dense catalyst phase.

Conduit 5 is connected by means of manifold 6 with conduits 7 and 8 which comprise other sections of extra heavy 6-inch steel pipe. Conduits 7 and 8 contain filters 9 and 10 which are constructed of porous material which is permeable to the gas and vapors emerging from the reaction zone but impermeable to the catalyst particles carried by entrainment in the gas stream. Filters 9 and 10 are cylindrical in shape and closed at the bottom ends. They are dimensioned in relation to conduits 7 and 8 to provide a substantial annular space between the filter and the inner wall of the enclosing conduit for the passage of gases and vapors and entrained catalyst upwardly about the outer surface of the filter. The upper ends of filters 9 and 10 are mounted in closure means 11 and 12 in a manner whereby the gases and vapors must pass through either filter 9 or filter 10 to reach exit pipes 13 and 14. Each of filters 9 and 10 is approximately 36 inches long and 4½ inches in outside diameter, the filter walls being approximately ¾ of an inch thick.

The greater part of reactor 1 is enclosed in a jacket 15 which extends from a point near the top of the reactor to a point sufficiently low to enclose the 3-inch length of conical section 2 and approximately 5 inches of pipe 3. Jacket 15 comprises a length of extra heavy 4-inch steel pipe having an inside diameter of 3.83 inches. The ends of jacket 15 are formed by closing the ends of the 4-inch pipe in any suitable manner, as shown. Access to the interior of jacket 15 is provided by an opening 16 in the top thereof through a 2-inch steel pipe. Jacket 15 is adapted to contain a body of liquid for temperature control purposes, such as water, or "Dowtherm." The vapors which are evolved by the heat of reaction are withdrawn at 16, condensed, and returned through 16 to the body of temperature control fluid in jacket 15. The temperature control fluid in jacket 15 is maintained under a pressure at which the liquid boils at the temperature desired in jacket 15. Heating means, not shown, are provided in connection with jacket 15 to heat the temperature control fluid therein to any desired temperature.

In order to show all the essential parts of the reactor and associated catalyst separation means on a single sheet, a large proportion of the apparatus has been eliminated by the breaks at 17 and 18. For a clear understanding of the relative proportions of the apparatus, reference may be had to the over-all length of the apparatus, from the bottom of jacket 15 to exit pipes 13 and 14, which is 224 inches. In each of breaks 17 and 18 the portion of the apparatus eliminated is identical with that portion shown immediately above and below each break.

In the operations carried out in the apparatus of the drawing, the catalyst recovery means, comprising filters 9 and 10, are effective to separate substantially completely entrained catalyst from the outgoing stream of gases and vapors. The disengagement of solids from the gas stream is promoted by the lowered velocity of the gas stream in conduit 5 and remaining solids are separately on the outer surfaces of filters 9 and 10. The latter are employed alternatively during the operation so that the stream of gases and vapors and entrained solids passes from conduit 5 through either the left or right branches of manifold 6 into conduit 7 or conduit 8. During the alternate periods, the filter which is not in use is subjected to a back pressure of inert gas which is introduced at a rate sufficient to dislodge catalyst which has accumulated on the outer surface of the filter during the active period. Such "blow-back" gas and dislodged catalyst flows downwardly in the conduit enclosing the filter and into manifold 6 in which the "blow-back" gas is combined with the reaction mixture flowing upwardly from conduit 5. The greater part of the catalyst thus dislodged settles downwardly into the reactor and is thus returned for further use.

In the operation of the apparatus of the drawing the desired quantity of powdered catalyst is introduced directly into the reactor through a suitable connection, not shown, in conduit 5. After any desired preliminary reducing or activation treatment, the temperature of the fluid in jacket 15 is adjusted by the heating means mentioned above and by the pressure control means to the temperature desired to be maintained in jacket 15 during the reaction. After the catalyst mass had reached the reaction temperature, the introduction of the reaction mixture through pipe 3 is initiated. The reaction mixture may be preheated approximately to the reaction temperature prior to its introduction through pipe 3, or the reactants may be heated to the reaction temperature through the passage thereof through that portion of pipe 3 which is enclosed by jacket 15 and by contact with the hot catalyst. It will be understood, furthermore, that the enclosure of pipe 3 in jacket 15 is not necessary to the invention and that the reactants may be heated to the reaction temperature solely by contact with the hot catalyst.

Pipe 3 is dimensioned with respect to reactor 1 and the desired superficial velocity whereby the velocity of the gases passing through pipe 3 is sufficiently high to prevent the passage of solids downwardly into pipe 3 against the incoming gas stream. A ball check valve, not shown, is provided in pipe 3 to prevent solids from passing downwardly out of the reactor when the gas stream is not being introduced into pipe 3.

Thermocouples for measuring the temperature in the reaction zone are placed in the center of reactor 1 at levels of 0.5, 1.5, 2.5, 4.5, 6.5 and 8.5 feet above pipe 3.

The recovery system used for the apparatus shown and the example hereinafter consisted of a steam jacketed primary receiver and a secondary receiver preceded by a tap water condenser. Effluent gas from the secondary receiver passed through a bed of activated carbon to remove light hydrocarbons from the gas before venting. The absorber was periodically steam stripped to recover absorbed material.

EXAMPLES

A catalyst was prepared in accordance with the following procedure:

A cobalt nitrate solution was prepared by dissolving 10,000 grams of $Co(NO_3)_2.6H_2O$ in 50 liters of water. A sodium carbonate solution was prepared by dissolving 6,100 grams of $Na_2CO_3.H_2O$ in 50 liters of water. With both solutions at the boiling point the cobalt nitrate solution was added with stirring to the sodium carbonate solution. After thorough stirring, 4,000 grams of dried "Super-Filtrol" preheated to 180–200° F. were added with vigorous stirring. The slurry thus obtained was filtered and filter cake was reslurried in 30 gallons of treated water. After standing for several hours, the slurry thus obtained was heated to boiling with vigorous stirring, after which the slurry was filtered again. During this operation the filter cake was washed with 300 gallons of hot treated water. The filter cake thus obtained had a water content of approximately 70 weight per cent. This material was partially dried at room temperature to a water content of approximately 57 per cent and was then extruded through a ⅜ inch diameter orifice. The extruded material was heated overnight in an oven at 420° F. The material thus obtained was in the form of hard lumps and had a water content of approximately 7.6 weight per cent. This material was then ground in a Braun disc mill and screened to collect material passing through a 40 mesh sieve. Material which did not pass the sieve was recycled to reduce the batch to a size smaller than 40 mesh.

The following is a screen analysis of the catalyst powder:

| Size Range | Weight Percent |
| --- | --- |
| 40+ | Trace |
| 40/60 | 5.0 |
| 60/80 | 6.9 |
| 80/100 | 4.0 |
| 100/120 | 1.0 |
| 120/140 | 9.4 |
| 140/200 | 12.9 |
| 200/pan | 60.8 |

About 6.3 pounds of this material was charged to reactor 1, this amount being chosen to produce 5.8 pounds of catalyst in the reactor after reduction. The unit was flushed out with nitrogen and then hydrogen was passed in through pipe 3. Jacket 15 was filled with a suitable temperature control fluid such as "Dowtherm" and by heating this fluid in the manner described above the temperature of the catalyst mass was gradually raised. After the temperature of the catalyst was raised to 400° F. the rate of introduction of hydrogen was increased to 40 cubic feet per hour and the temperature was raised, while operating at that velocity, to 700° F. This operation was continued for about 26 hours until the formation of water ceased, after which the hydrogen flow rate was lowered to 5 cubic feet per hour and the temperature was lowered to 300° F. in a relatively short time. The catalyst composition by weight was Co : 2 "Super-Filtrol."

The "Dowtherm" was then removed from jacket 15 and replaced with water at a temperature equivalent to a catalyst temperature of 300° F. The introduction of feed gas, consisting essentially of 2 parts of hydrogen and 1 part of carbon monoxide was then initiated at a space velocity of 333 volumes per hour per volume of dense catalyst phase. The reaction temperature level was raised to an average of 360° F. in two hours and thereafter was raised to 400° F. in a space of fourteen hours. The operation was continued thereafter under various experimental conditions. The regeneration of the catalyst can be effected in situ in a similar manner as the initial reduction treatment by discontinuing the flow of synthesis gas and substituting hydrogen therefor.

For a specific example of the improved method of operation of this invention, reference is made to a 12-hour period of the above operating run occurring after 369 hours of operation. In this period, a feed gas consisting of 30.9% CO, 61.4% $H_2$ and 7.7% inerts, was introduced at atmospheric temperature through pipe 3 at the rate of 51 standard cubic feet per hour. This resulted in the formation of a dense bed whose upper level was approximately 4.7 feet above pipe 3, corresponding to a catalyst density of 44 pounds per cubic foot of dense phase. The superficial inlet velocity thus imposed on the reactor was 0.40 foot per second. The space velocity was 528 standard volumes of gas per hour per volume of dense catalyst phase. This corresponded to 2 standard liters of gas per hour per gram of cobalt or about 40 standard cubic feet of gas per hour per pound of cobalt. The average temperature at the various levels in the dense phase during this operation were:

At 0.5 foot, 418° F.
At 1.5 feet, 445° F.
At 2.5 feet, 447° F.
At 4.5 feet, 443° F.

It will be seen that the temperature of the catalyst in this operation was for the most part above 440° F. The temperature at 418° F. was measured substantially at the bottom of the dense phase and resulted from the cooling effect of the gas, which was introduced through pipe 3 at room temperature.

As a result of the above operation conditions, 64.6% of the CO charged to the reactor was converted, 47.5% being converted to a normally liquid hydrocarbon product including hydrocarbons having three or more carbon atoms per molecule and having an end boiling point of 670° F. The normally liquid product of this operation contained approximately 6% olefins. 11% of the CO charged to the reactor during this period was converted to hydrocarbons having 1 or 2 carbon atoms per molecule, and 6% was converted to $CO_2$. The liquid product amounted to 131 cc. per cubic meter of gas charged.

Various runs on a similar catalyst as described hereinbefore were made at pressures of atmospheric, 10 pounds per square inch gage, 25 pounds per square inch gage, and 45 pounds per square inch gage at varying space velocities and temperatures. The operating conditions and results of some of the typical runs are shown in Table I below. Typical analysis of the product of these runs is shown in Table II below.

*Table I*

POWDERED CATALYST OPERATION COBALT CATALYST

| Catalyst Age—Hours | 82 | 181 | 247 | 393 | 531 | 655 | 860 |
|---|---|---|---|---|---|---|---|
| Operating Conditions: | | | | | | | |
| Av. Catalyst Temp., °F | 402 | 407 | 400 | 436 | 461 | 418 | 438 |
| Outlet Pressure, p. s. i. g | (1) | (1) | 10 | 25 | 45 | 45 | 25 |
| Bed Height, Ft | 5.9 | 4.2 | 4.5 | 4.7 | 5.5 | 5.5 | 4.6 |
| Cat. Density, #/cu. ft | 45 | 63 | 59 | 44 | 50 | 49 | 44 |
| Av. Velocity, ft./sec | 0.84 | 0.23 | 0.31 | 0.35 | 0.62 | 0.63 | 0.93 |
| Contact Time, Sec | 7 | 18 | 15 | 13 | 9 | 9 | 14 |
| Space Velocity, V./Hr./V | 400 | 175 | 325 | 530 | 1188 | 1219 | 2 323 |
| $H_2$:CO Ratio | 2:1 | 2:1 | 2:1 | 2:1 | 2:1 | 3:1 | 2.1 |
| Recycle ratio (vol.) | | | | | | | 1.8 |
| Results: | | | | | | | |
| Contraction, Vol. Percent | 24.7 | 65.3 | 52.3 | 51.9 | 43.4 | 31.1 | 64.3 |
| CO Conversion, percent | 32.1 | 67.0 | 51.4 | 68.6 | 52.3 | 29.7 | 64.7 |
| Observed Oil, cc/m.³F.F | 4 | 23 | 46 | 42 | 17 | 15 | 25 |
| Total oil, cc./m.³ F.F | 53 | 150 | 112 | 135 | 75 | 39 | 126 |
| Observed Water, cc./m.³F.F | 78 | 143 | 140 | 137 | 106 | 68 | 150 |
| Selectivity, Percent: | | | | | | | |
| CO—Total Oil | 59.5 | 76.3 | 76.2 | 68.4 | 56.8 | 63.6 | 71.2 |
| CO—$CH_4$ | 37.1 | 22.1 | 21.9 | 26.2 | 26.4 | 24.3 | 24.3 |
| CO—$CO_2$ | 3.4 | 1.6 | 1.9 | 5.4 | 16.8 | 12.1 | 4.5 |

¹Atmospheric.
² Fresh feed only.

*Table II*

POWDERED COBALT CATALYST PRODUCT INSPECTIONS

| Catalyst Age—Hours | 181 | 247 | 393 | 655 |
|---|---|---|---|---|
| Operating Conditions: | | | | |
| Temperature, ° F | 407 | 400 | 436 | 418 |
| Pressure, p. s. i. g | (1) | 10 | 25 | 45 |
| $H_2$:CO | 2:1 | 2:1 | 2:1 | 3:1 |
| Heavy Oil: | | | | |
| Gravity, ° A. P. I | 57.9 | 58.1 | 60.6 | 59.3 |
| ASTM Distillation— | | | | |
| I. B. P | 240 | 222 | 178 | 204 |
| 10 | 305 | 291 | 249 | 280 |
| 50 | 384 | 392 | 345 | 383 |
| 90 | 508 | 567 | 536 | 563 |
| E. P | 564 | 635 | 658 | 657 |
| Molecular Weight | 170 | 176 | 155 | 171 |
| Olefins, Vol. Percent | 0.8 | 1.7 | 6.5 | 0.5 |
| Adsorber Oil: | | | | |
| Gravity, ° A. P. I | | 77.5 | 79.9 | 82.7 |
| ASTM Distillation— | | | | |
| I. B. P | | 88 | 86 | 95 |
| 10 | | 104 | 108 | 119 |
| 50 | | 131 | 141 | 154 |
| 90 | | (250) | 246 | 228 |
| E. P | | | | 269 |
| RVP, p. s. i. g | | 13.6 | 15.7 | 11.0 |
| Olefins, Vol. Percent | | 11.5 | 15.7 | 4.0 |
| Steaming Gas ²: | | | | |
| Olefins, Vol. Percent— | | | | |
| $C_2$ | 1.4 | 3.2 | | |
| $C_3$ | 15.0 | 11.8 | 12.2 | 7.2 |
| $C_4$ | 52.5 | 15.6 | 17.0 | 10.2 |
| Liquid Distribution, Percent: | | | | |
| $C_3$–400° F. E. P | 93 | 81 | 90 | 82 |
| 400° F.+ | 7 | 19 | 10 | 18 |

¹ Atmospheric.
² Gas resulting from steam stripping the activated carbon absorbers.

Examination of Table I reveals a great reduction in conversion to methane and a corresponding increase in conversion to oil as the pressure was raised from atmospheric to ten and twenty-five pounds gage. A study of Table II shows that the products from this operation were unusually paraffinic, or conversely the olefin content was very low. Atmospheric pressure operation produced a heavy oil containing less than 1% olefins. A test period at 10 pounds per square inch gage yielded a condensed oil with but 1.7% olefins. Increasing pressure to 45 pounds per square inch gage and the $H_2$ : CO ratio from 2:1 to 3:1 resulted in a heavy oil with only 0.5% unsaturates. The olefin content of the adsorber oil (light naphtha steam stripped from activated carbon adsorbers) was somewhat higher than that of the heavy oil. Likewise, the unsaturation of the $C_3$-$C_4$ fraction was greater than in the heavy oil. Nevertheless, the olefin content of the various products were considerably lower than from conventional fixed bed operations.

The low olefin content of the heavy oil coupled with its straight chain structure results in a superior diesel fuel. Thus, products from a test at 45 pounds per square inch gage, about 1000 v/hr./v space velocity, and 430° F. upon fractionation yield a fuel with a diesel index of 102 and an olefin content of only 2%. The diesel fuel cut (300° F.+) represented about 32 per cent of the yield of total oil. The A. P. I. gravity of the diesel oil cut was about 55 and the aniline point was about 186° F.

After 1115 hours of operation, the catalyst when 100 grams thereof was placed in a 250 cc. graduate had a density of 52.4 pounds per cubic foot after vigorous shaking of the graduate. Allowing the catalyst to settle freely resulted in a density of 67.8 pounds per cubic foot. Packing the catalyst in the graduate by tapping the bottom of the graduate on a table resulted in a density of 82.2 pounds per cubic foot. Flow tests in a 1½ inch diameter glass tube indicated the catalyst was aerated at linear gas velocities between about 0.2 and about 1.0 foot per second with a variation in density between about 51 and about 34 pounds per cubic foot. The used powdered catalyst contained below one per cent adsorbed hydrocarbons.

We claim:

1. In a process for hydrogenating carbon monoxide to produce normally liquid hydrocarbons as the principal product in which a gaseous mixture of hydrogen and carbon monoxide in a mol ratio not substantially lower than about 2:1 and not substantially higher than about 5:1 is passed upwardly in a reaction zone through a mass of finely divided contact material comprising reduced metal hydrogenating catalyst comprising cobalt to maintain the body of contact material substantially in suspension in said gas stream at a temperature which causes reaction of hydrogen and carbon monoxide to produce normally liquid hydrocarbons, the improvement which comprises maintaining a temperature between about 440° F. and about 500° F., a pressure between about atmospheric and about 45 pounds per square inch gage, and a conversion of carbon monoxide of at least 50 per cent per pass, maintaining the above operating conditions such that the space velocity is not substantially greater than about 1200 and that shown in Figure 1 of the drawings for a given temperature and a given pressure, and recovering normally liquid hydrocarbons as a product of the process.

2. In a process for hydrogenating carbon monoxide to produce normally liquid hydrocarbons as the principal product in which a gaseous mixture of hydrogen and carbon monoxide in a mol ratio not substantially lower than about 2:1 and not substantially higher than about 5:1 is passed upwardly in a reaction zone through a mass of finely divided contact material comprising reduced metal hydrogenating catalyst comprising cobalt to maintain the body of contact material substantially in suspension in said gas stream at a temperature which causes reaction of hydrogen and carbon monoxide to produce normally liquid hydrocarbons, the upward velocity of said gaseous mixture being sufficient to maintain the greater part of said mass of contact material in a fluidized pseudo-liquid dense phase condition in which the catalyst particles circulate at a high rate, the improvement which comprises maintaining a temperature between about 440° F. and about 500° F., a pressure between about atmospheric and about 45 pounds per square inch gage and a conversion of carbon monoxide of at least 50 per cent per pass, maintaining the above operating conditions such that the space velocity is not substantially greater than about 1200 and that shown in Figure 1 of the drawings for a given temperature and a given pressure, and recovering normally liquid hydrocarbons as a product of the process.

3. A process for hydrogenating carbon monoxide to produce a high quality diesel fuel which comprises passing a gaseous mixture comprising hydrogen and carbon monoxide in a mol ratio between about 2:1 and 3:1 upwardly in a reaction zone through a mass of finely divided contact material comprising cobalt supported on an inert support at a linear velocity effective to suspend said mass in said gas stream in a fluidized pseudo-liquid dense phase condition in which the particles of contact material circulate at a high rate throughout the mass under conditions such that hydrogen and carbon monoxide react to produce normally liquid organic compounds including a diesel fuel fraction, maintaining a temperature between about 435° F. and about 550° F., a pressure between about atmospheric and about 45 pounds per square inch gage and a conversion of carbon monoxide of at least 50 per cent per pass, maintaining the above operating conditions such that the space velocity is not substantially greater than about 1200 and that shown in Figure 1 for a given temperature and a given pressure, withdrawing an effluent from said reaction zone and recovering therefrom a diesel fuel fraction as a product of the process.

4. In a process for hydrogenating carbon monoxide in which a gaseous mixture of hydrogen and carbon monoxide in a mol ratio not substantially lower than about 2:1 and not substantially higher than about 5:1 is passed upwardly in a reaction zone through a mass of finely divided contact material comprising cobalt to maintain the body of contact material substantially in suspension in said gas stream at a temperature which causes reaction of hydrogen and carbon monoxide to produce normally liquid hydrocarbons, the improvement which comprises maintaining a temperature between about 435° F. and about 550° F., a pressure between about atmospheric and about 45 pounds per square inch gage and a conversion of carbon monoxide of at least 50 per cent per pass, maintaining the above operating conditions such that the space velocity is not substantially greater than about 1200 and that shown in Figure 1 of the drawings for a given temperature and a given pressure, and recovering normally liquid hydrocarbons as a product of the process.

5. A process for hydrogenating carbon monoxide to produce a high quality diesel fuel which comprises passing a gaseous mixture comprising hydrogen and carbon monoxide in a mol ratio not substantially lower than about 2:1 and not substantially higher than about 5:1 upwardly in a reaction zone through a mass of finely divided contact material comprising cobalt supported on Super-Filtrol at a linear velocity to suspend said mass in said gas stream under conditions such that hydrogen and carbon monoxide react to produce normally liquid organic compounds including a diesel fuel fraction maintaining a temperature between about 440° F. and about 500° F., a pressure between about atmospheric and about 45 pounds per square inch gage and a conversion of carbon monoxide of at least 50 per cent per pass, maintaining the above operating conditions such that the space velocity is not substantially greater than about 1200 and that shown in Figure 1 of the drawings for a given temperature and a given pressure, withdrawing a reaction effluent from said reaction zone and recovering a diesel fuel fraction from said effluent as a product of the process.

6. In a process for hydrogenating carbon monoxide to produce normally liquid hydrocarbons in which a gaseous mixture of hydrogen and carbon monoxide in a mol ratio not substantially lower than about 2:1 and not substantially higher than about 5:1 is passed upwardly in a reaction zone through a mass of finely divided contact material comprising cobalt supported on Super-Filtrol to maintain the body of contact material substantially in suspension in said gas stream at a temperature which causes the reaction of hydrogen to carbon monoxide, the improvement which comprises maintaining a temperature between about 440° F. and about 500° F., a pressure between about atmospheric and about 45 pounds per square inch gage and a conversion of carbon monoxide of at least 50 per cent per pass, maintaining the above operating conditions such that the space velocity is not substantially greater than about 1200 and that shown in Figure 1 of the drawings for a given temperature and a given pressure, and recovering normally liquid hydrocarbons as a product of the process.

LOUIS C. RUBIN.
EARL W. RIBLETT.
HENRY G. McGRATH.

(References on following page)

REFERENCES CITED

The following references are of record in the file of this patent:

UNITED STATES PATENTS

| Number | Name | Date |
|---|---|---|
| 1,984,380 | Odell | Dec. 18, 1934 |
| 2,347,682 | Gunness | May 2, 1944 |
| 2,360,787 | Murphree | Oct. 17, 1944 |
| 2,447,505 | Johnson | Aug. 24, 1948 |

OTHER REFERENCES

Weil et al.: Synthetic Petroleum From the Synthene Process, pp. 85–89.